(12) United States Patent
Hung

(10) Patent No.: US 6,390,326 B1
(45) Date of Patent: May 21, 2002

(54) PRESSURE VESSEL AND METHOD MANUFACTURING THE SAME

(76) Inventor: Peter Pei-Su Hung, No. 1-1, Tzu-Chiang Second Rd., Nan-Tou City, Nan-Tou Hsien (TW)

( * ) Notice: Subject to any disclaimer, the term of this patent is extended or adjusted under 35 U.S.C. 154(b) by 0 days.

(21) Appl. No.: 09/677,514

(22) Filed: Sep. 29, 2000

(51) Int. Cl.[7] .................................................. B65D 8/00
(52) U.S. Cl. ...................... 220/616; 220/618; 220/619; 220/915
(58) Field of Search ................ 220/915, 619, 220/616, 618

(56) References Cited

U.S. PATENT DOCUMENTS

| | | | | |
|---|---|---|---|---|
| 2,961,128 A | * | 11/1960 | Cochran | 220/915 |
| 2,973,114 A | * | 2/1961 | Patton | 220/915 |
| 3,006,510 A | * | 10/1961 | Sagarin | 220/915 |
| 3,049,263 A | * | 8/1962 | Edelstone et al. | 220/915 |
| 3,162,329 A | * | 12/1964 | Gregory | 220/915 |
| 3,170,602 A | * | 2/1965 | Suellentrop, Jr. et al. | 220/915 |
| 3,514,011 A | * | 5/1970 | Maegira et al. | 220/915 |
| 3,679,090 A | * | 7/1972 | Miller et al. | 220/619 |
| 3,700,136 A | * | 10/1972 | Ruckberg | 220/619 |
| 3,934,751 A | * | 1/1976 | Green et al. | 220/915 |
| 4,942,971 A | * | 7/1990 | Hidding | 220/915 |
| 5,348,174 A | * | 9/1994 | Velicka | 220/915 |
| 5,765,714 A | * | 6/1998 | Nakano et al. | 220/619 |
| 5,865,337 A | * | 2/1999 | Diamond et al. | 220/619 |

* cited by examiner

Primary Examiner—Joseph M. Moy
(74) Attorney, Agent, or Firm—Charles E. Baxley

(57) ABSTRACT

A pressure vessel includes a body with a closed end and a neck extends from the other end of the body and encloses an opening. A metal collar is mounted to the neck. A valve device is engaged with an inner periphery of the neck and has a peripheral wall extending through the opening. The peripheral wall is folded outward to wrap and position the collar.

4 Claims, 6 Drawing Sheets

PRESSURE VESSEL AND METHOD MANUFACTURING THE SAME

FIELD OF THE INVENTION

The present invention relates to a plastic pressure vessel having a valve member engaged with an opening of the vessel and a method for manufacturing the plastic vessel.

BACKGROUND OF THE INVENTION

A conventional pressure vessel for receiving a suitable filling in the vessel under pressure is generally made of metal and a valve means is connected to the opening of the vessel. When operating the valve, the filling such as coolant or gel is sprayed out at a speed. However, an inherent shortcoming of the metal vessel is that the cost of the metal material and the machinery for manufacturing the pressure vessels are so high that the product cannot have a lower price. Furthermore, the metal made the vessels could be corroded by the filling after two or three years and this could cause a dangerous result. The metal vessels are heavy so that it is not suitable for transportation. It is expensive to recycle or clean the used vessels.

The present invention intends to provide a pressure vessel that is made of PET and a metal collar is mounted to a neck of the vessel so that the pressure vessel beats the shortcomings of the conventional metal vessels.

SUMMARY OF THE INVENTION

In accordance with one aspect of the present invention, there is provided a pressure vessel and comprising a body having a closed end and a neck extending from the other end of the body. An opening is enclosed by the neck and a collar is mounted to the neck. A valve means includes a disk from which a valve member extends. The valve member is enclosed by a peripheral wall extending from the disk. The peripheral wall is engaged with an inner periphery of the neck and has an outward folded top edge which warps and positions the collar.

The primary object of the present invention is to provide a pressure vessel which is made of plastic and has a metal collar mounted to a neck of the pressure vessel. The metal collar is positioned by a valve means which is engaged with the neck.

Another object of the present invention is to provide a method for manufacturing a plastic pressure vessel.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
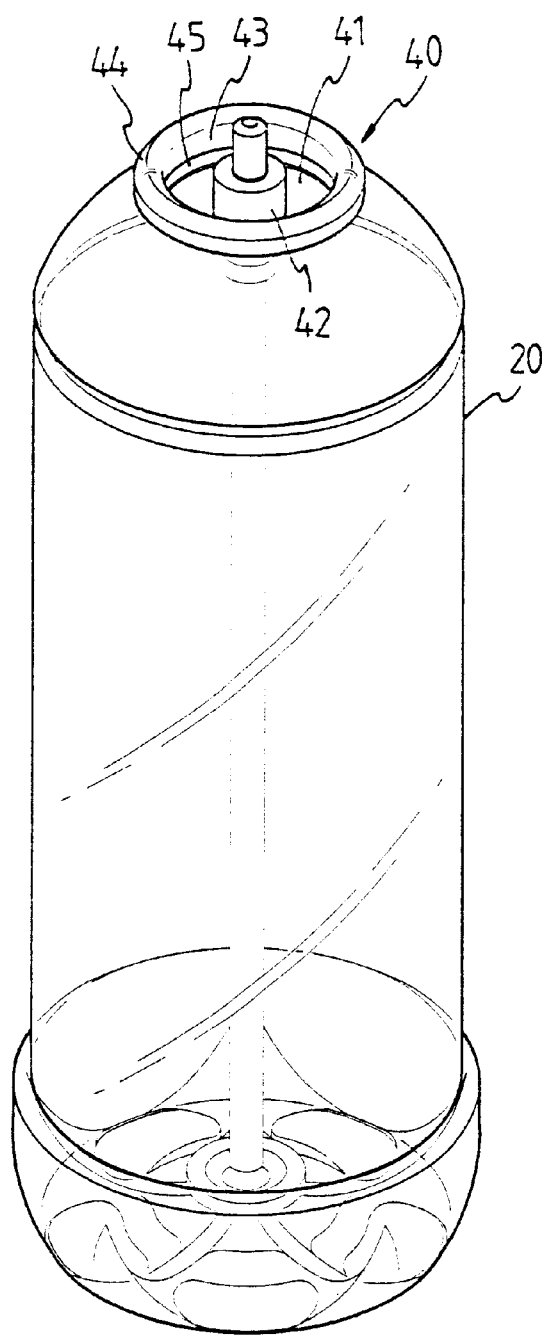
FIG. 1 is a perspective view to show a pressure vessel of the present invention.
Figure 2:
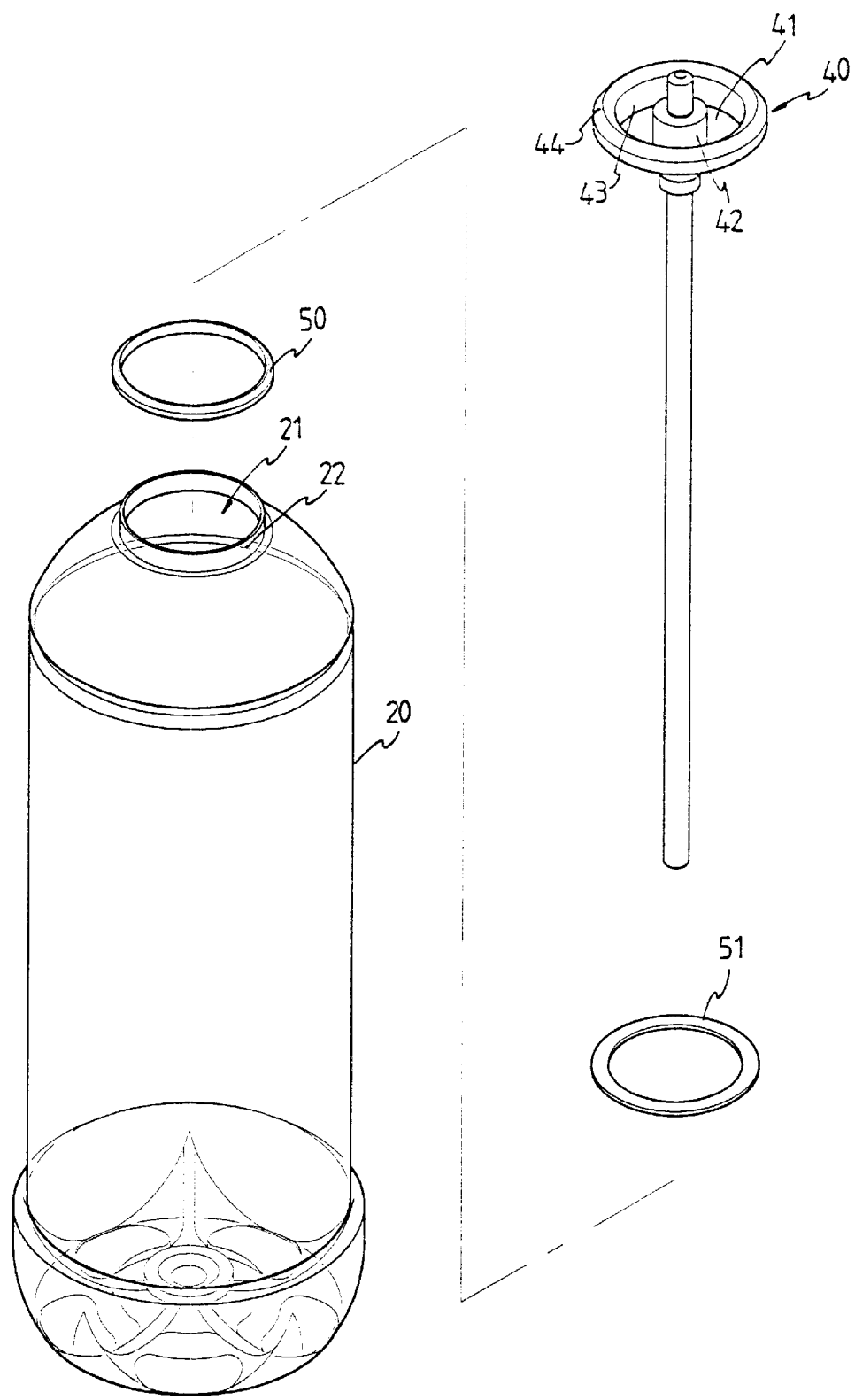
FIG. 2 is an exploded view to show the pressure vessel of the present invention.
Figure 3:
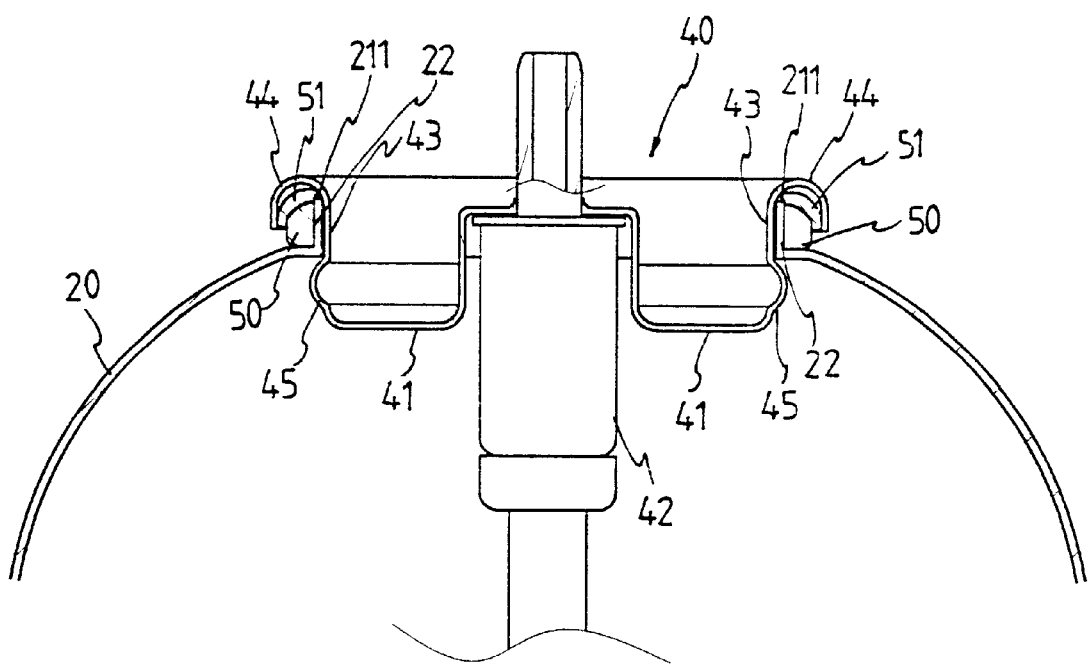
FIG. 3 is a cross sectional view to show an engagement between the valve means and the neck of the pressure vessel of the present invention.

Referring to FIGS. 1 to 3, the pressure vessel of the present invention comprises a body 20 made of plastic material such as PET and the body 20 has a closed end and a neck 22 extending from the other end of the body 20. An opening 21 is enclosed by the neck 22, and the diameter of the neck 22 is smaller than the diameter of the body 20. A metal collar 50 is mounted to the neck 22. A valve means 40 includes a disk 41 from which a valve member 42 extends and the valve member 42 is enclosed by a peripheral wall 43 which extends from the disk 41. The peripheral wall 43 is engaged with an inner periphery of the neck 22 and the peripheral wall 43 has an outward folded top edge 44 which wraps the collar 50 so that the collar 50 is positioned between the neck 22 and the outward folded top edge 44. A seal 51 IS located between the collar 50 and the outward folded top edge 44 to ensure no leakage between the neck 22 and the outward folded top edge 44.

In order to position the valve means 40, a peripheral convex portion 45 is made to extend radially outward from the peripheral wall 43. The peripheral convex portion 45 is located in the body 20 and below the neck 22. An inner diameter of the peripheral convex portion 45 is larger than an inner diameter of the neck 22 so that the valve means 40 will not drop from the opening 21. Filling such as gel is put in the body 20 before the valve means 40 is engaged with the neck 22 and the pressure in the body 20 is increased by using a proper machine via the valve member 42 so that when operating the valve member 42, the filling in the body 20 flows out from the valve member 42.

Figure 4:
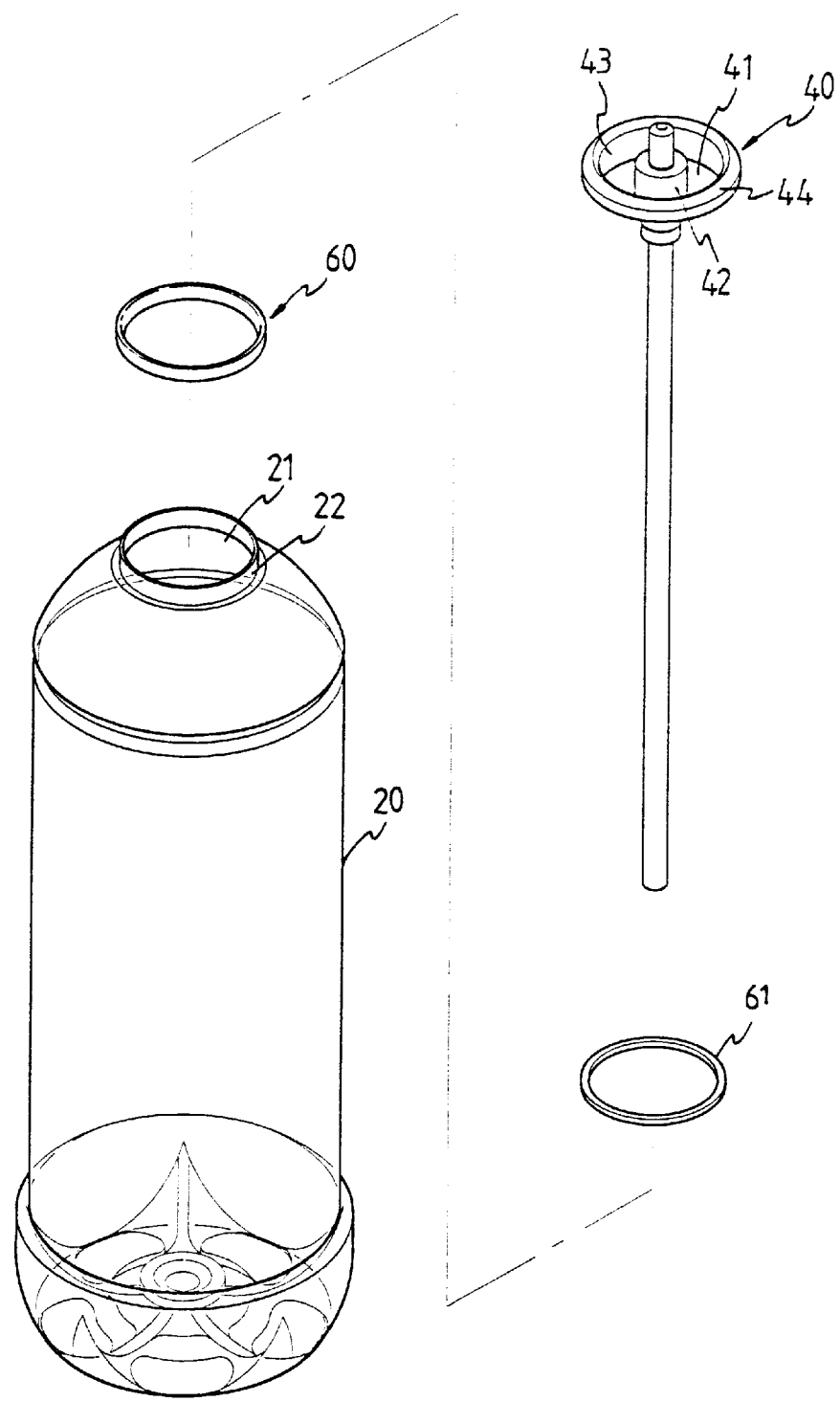
FIG. 4 is an exploded view to show another embodiment of the pressure vessel of the present invention.
Figure 5:
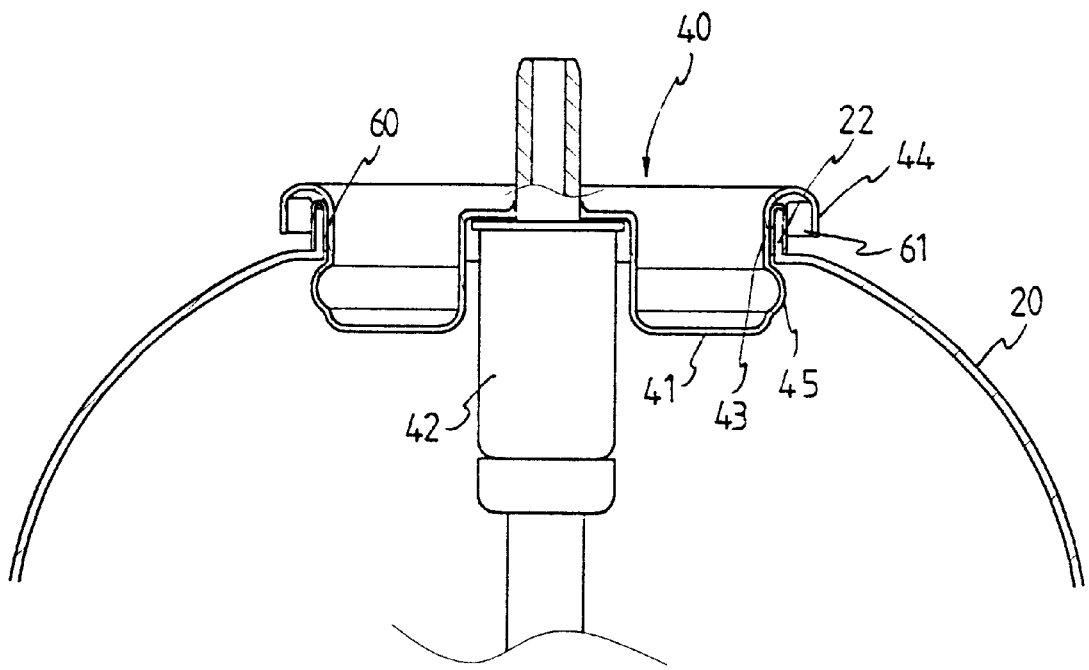
FIG. 5 is a cross sectional view to show an engagement between the valve means and the neck of the pressure vessel as shown in FIG. 4 of the present invention.

FIGS. 4 and 5 show another embodiment of the present invention, wherein a ring 60 having a U-shaped cross section is mounted to the neck 22 by inserting the neck 22 in the groove of the ring 60. A collar 61 is then mounted to the neck 22 and positioned between the outward folded top edge 44 and the ring 60. The ring 60 performs as a seal to prevent leakage.

Figure 6:
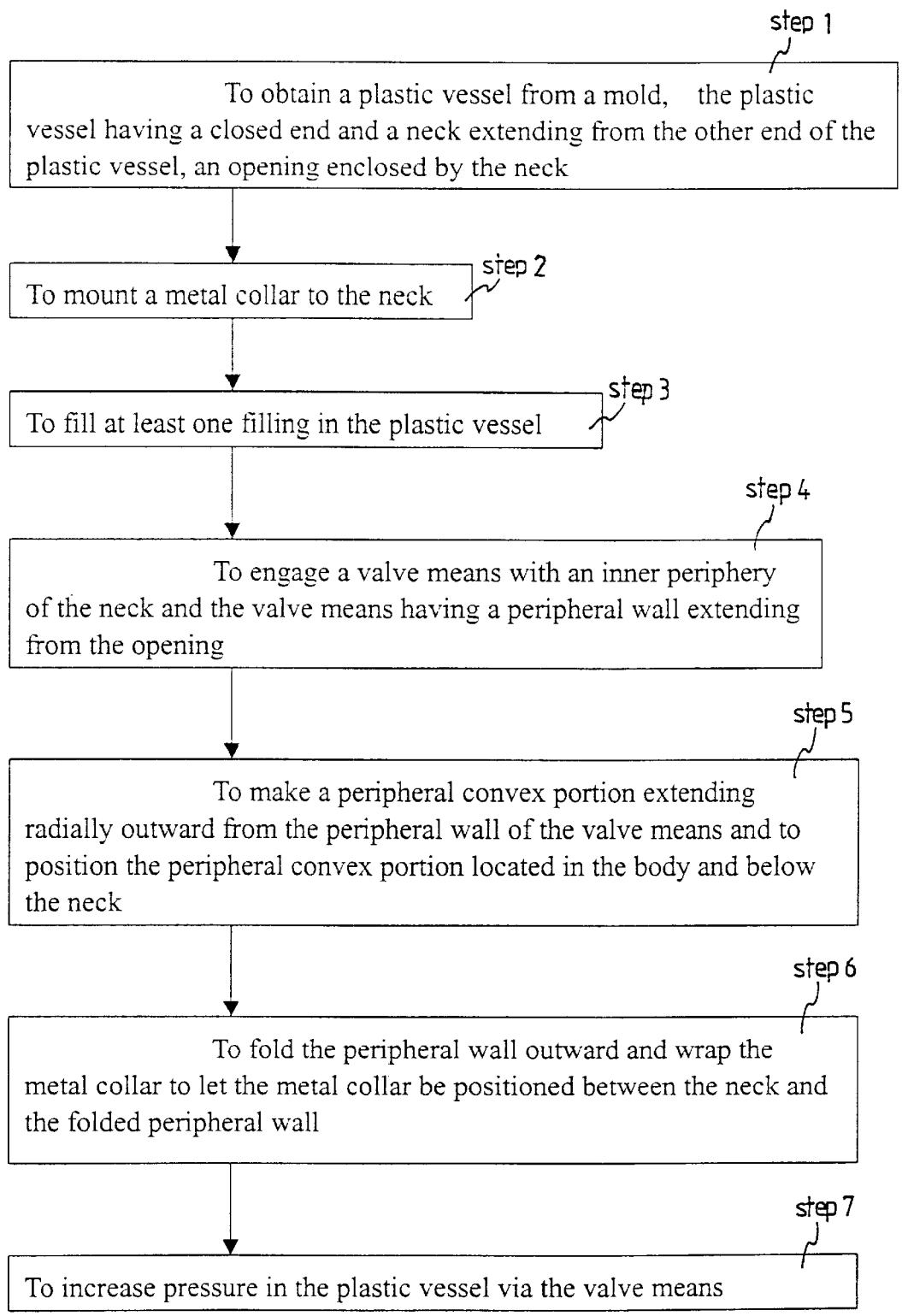
FIG. 6 is a flow chart of a method for manufacturing the pressure vessel of the present invention.

FIG. 6 shows a method for manufacturing the pressure vessel, and comprising the following steps:

step 1: to obtain a plastic vessel by way of blowing molding in a mold. The plastic vessel has a closed end and a neck on the other end of the plastic vessel. The neck encloses an opening of the plastic vessel.

step 2: to mount a metal collar to the neck;

step 3: to fill a suitable filling in the plastic vessel;

step 4: to engage a valve means with an inner periphery of the neck and the valve means having a peripheral wall extending from the opening;

step 5: to make a peripheral convex portion extending radially outward from the peripheral wall of the valve means and to position the peripheral convex portion located in the body and below the neck;

step 6: to fold the peripheral wall outward and wrap the metal collar to let the metal collar be positioned between the neck and the folded peripheral wall, and step 7: to increase pressure in the plastic vessel via the valve means While we have shown and described various embodiments in accordance with the present invention, it should be clear to those skilled in the art that further embodiments may be made without departing from the scope and spirit of the present invention.

What is claimed is:

1. A pressure vessel comprising:

a plastic body having a closed end and a neck extending from the other end of said plastic body and an opening being enclosed by said neck;

a collar mounted to said neck, and a valve means having a disk from which a valve member extends, said valve member enclosed by a peripheral wall extending from said disk, said peripheral wall engaged with an inner periphery of said neck, said peripheral wall having an outward folded top edge and said collar being wrapped between said neck and said outward folded top edge.

2. The pressure vessel as claimed in claim 1 further comprising a seal located between said collar and said outward folded top edge.

3. The pressure vessel as claimed in claim 1 further comprising a peripheral convex portion extending radially outward from said peripheral wall, said peripheral convex portion located in said body and an inner diameter of said peripheral convex portion being larger than an inner diameter of said neck.

4. The pressure vessel as claimed in claim 1 further comprising a ring having an annular groove defined therein and said neck inserted in said groove of said ring, said collar positioned between said outward folded top edge and said ring.

* * * * *